US012218927B2

(12) United States Patent
Loncaric et al.

(10) Patent No.: US 12,218,927 B2
(45) Date of Patent: Feb. 4, 2025

(54) METHOD AND SYSTEM FOR FRICTIONLESS APPLICATION AUTHENTICATION

(71) Applicant: JPMorgan Chase Bank, N.A., New York, NY (US)

(72) Inventors: Goran Loncaric, Frisco, TX (US); Mimi Wang, New York, NY (US); Sandeep Reddy Banala, Monroe, NJ (US); Bipin More, Edison, NJ (US)

(73) Assignees: JPMORGAN CHASE BANK, N.A., New York, NY (US); JPMORGAN CHASE BANK, N.A., New York, NY (US)

( * ) Notice: Subject to any disclaimer, the term of this patent is extended or adjusted under 35 U.S.C. 154(b) by 214 days.

(21) Appl. No.: 17/963,848

(22) Filed: Oct. 11, 2022

(65) Prior Publication Data
US 2024/0121232 A1    Apr. 11, 2024

(51) Int. Cl.
*H04L 9/40* (2022.01)
(52) U.S. Cl.
CPC ................. *H04L 63/0815* (2013.01)
(58) Field of Classification Search
None
See application file for complete search history.

(56) References Cited

U.S. PATENT DOCUMENTS

| | | | |
|---|---|---|---|
| 11,080,385 B1 * | 8/2021 | Angara | H04W 12/068 |
| 2004/0111644 A1 | 6/2004 | Saunders et al. | |
| 2010/0293608 A1 * | 11/2010 | Schechter | H04L 9/3218 |
| | | | 726/8 |
| 2012/0060025 A1 * | 3/2012 | Cahill | H04L 63/10 |
| | | | 713/155 |
| 2015/0071181 A1 * | 3/2015 | Nasir | H04W 28/20 |
| | | | 370/329 |
| 2016/0063234 A1 * | 3/2016 | Charng | G06V 40/171 |
| | | | 726/19 |

(Continued)

FOREIGN PATENT DOCUMENTS

WO    2018/063583    4/2018

OTHER PUBLICATIONS

International Search Report and Written Opinion issued in International Patent Application No. PCT/US2023/032276, dated Dec. 7, 2023.

*Primary Examiner* — Raqiul A Choudhury
(74) *Attorney, Agent, or Firm* — Greenblum & Bernstein, P.L.C.

(57) ABSTRACT

A method for facilitating application authentication bypass based on proximate with time using device authentication is disclosed. The method includes receiving a request from a user to access an application on a user device, the request including an application authentication request; accessing the user device via a device application programming interface; retrieving, via the device application programming interface, device authentication data, the device authentication data including a timeline of successful device authentications; determining whether the device authentication data is within a predetermined threshold; authenticating the request by using the device authentication data when the device authentication data is within the predetermined threshold; and permitting access to the application based on a result of the authenticating.

20 Claims, 6 Drawing Sheets

(56) References Cited

U.S. PATENT DOCUMENTS

| | | |
|---|---|---|
| 2017/0063836 A1* | 3/2017 | Cui ..................... H04L 63/0884 |
| 2020/0151313 A1 | 5/2020 | Taveau et al. |
| 2020/0259832 A1 | 8/2020 | Sabin et al. |
| 2021/0406866 A1* | 12/2021 | Quentin ................ H04L 9/3239 |
| 2022/0141212 A1* | 5/2022 | Kumar ................ H04L 63/0807 |
| | | 726/4 |

* cited by examiner

METHOD AND SYSTEM FOR FRICTIONLESS APPLICATION AUTHENTICATION

BACKGROUND

1. Field of the Disclosure

This technology generally relates to methods and systems for application authentication, and more particularly to methods and systems for facilitating application authentication bypass based on proximate with time using device authentication to provide frictionless application authentication.

2. Background Information

Many business entities provide services for users via applications on user devices. Often, the user devices and the applications operate incompatible and distinct authentication mechanisms to facilitate secured user access. Historically, implementations of conventional authentication techniques for the user devices and the applications have resulted in varying degrees of success with respect to interoperability and usability for the users.

One drawback of using the conventional authentication techniques is that in many instances, user device authentication mechanisms and application authentication mechanisms are not usable together to authenticate a user. As a result, the user must needlessly repeat authentication actions such as, for example, providing biometric data to unlock the user device and then providing the same biometric data again to access the application. The user must repeat these authentication actions to access the application even though the user device recently authenticated the user.

Therefore, there is a need to facilitate application authentication bypass based on proximate with time using device authentication to provide less friction for the user to authenticate for the application.

SUMMARY

The present disclosure, through one or more of its various aspects, embodiments, and/or specific features or sub-components, provides, inter alia, various systems, servers, devices, methods, media, programs, and platforms for facilitating application authentication bypass based on proximate with time using device authentication to provide frictionless application authentication.

According to an aspect of the present disclosure, a method for facilitating application authentication bypass based on proximate with time using device authentication is disclosed. The method is implemented by at least one processor. The method may include receiving a request from a user to access an application on a user device, the request may include an application authentication request; accessing the user device via a device application programming interface; retrieving, via the device application programming interface, device authentication data, the device authentication data may include a timeline of successful device authentications; determining whether the device authentication data is within a predetermined threshold; authenticating the request by using the device authentication data when the device authentication data is within the predetermined threshold; and permitting access to the application based on a result of the authenticating.

In accordance with an exemplary embodiment, to authenticate the request, the method may further include retrieving a private key, a device token, and an identifier token from a device keychain of the user device, the device token may include a static token and a dynamic token; encrypting the identifier token with the dynamic token; signing the encrypted identifier token with the private key; generating an authentication payload that includes the signed and encrypted identifier token; transmitting, via an authentication application programming interface, the generated authentication payload to an authentication service that is associated with the application; and receiving an authentication response from the authentication service.

In accordance with an exemplary embodiment, to permit access to the application, the method may further include bypassing at least one authentication requirement of the application, wherein secured access to the application is permitted without additional authentication by the application.

In accordance with an exemplary embodiment, the request may correspond to an interaction between the user and the application on the user device, the interaction may include an action to open the application, access the application, and login to the application.

In accordance with an exemplary embodiment, the successful device authentications may relate to successful authentication of the user by the user device using at least one from among a code, a personal identification number, and biometric information, the biometric information may include at least one from among fingerprint information, facial feature information, and iris pattern information.

In accordance with an exemplary embodiment, to determine whether the device authentication data is within the predetermined threshold, the method may further include parsing the device authentication data to identify at least one successful device authentication event and the timeline; determining, by using the timeline, whether the at least one successful device authentication event is proximate to the request; and comparing a time associated with the at least one successful device authentication event with the predetermined threshold when the at least one successful device authentication event is proximate to the request.

In accordance with an exemplary embodiment, the predetermined threshold may correspond to a time period that is predetermined by the user as a user preference for the application.

In accordance with an exemplary embodiment, the predetermined threshold may correspond to a time period that is dynamically determined for the user based on a corresponding user profile, a corresponding user activity record, and an operating guideline.

In accordance with an exemplary embodiment, prior to authenticating the request, the method may further include initiating a complimentary authentication event to retrieve complimentary identifying information from the user via the user device, the complimentary identifying information may relate to a secondary authentication factor; and authenticating the request by using the device authentication data and the complimentary identifying information.

According to an aspect of the present disclosure, a computing device configured to implement an execution of a method for facilitating application authentication bypass based on proximate with time using device authentication is disclosed. The computing device including a processor; a memory; and a data transmission interface coupled to each of the processor and the memory, wherein the processor may be configured to receive a request from a user to access an application on a user device, the request may include an application authentication request; access the user device via a device application programming interface; retrieve, via the device application programming interface, device authentication data, the device authentication data may include a timeline of successful device authentications; determine whether the device authentication data is within a predetermined threshold; authenticate the request by using the device authentication data when the device authentication data is within the predetermined threshold; and permit access to the application based on a result of the authenticating.

In accordance with an exemplary embodiment, to authenticate the request, the processor may be further configured to retrieve a private key, a device token, and an identifier token from a device keychain of the user device, the device token may include a static token and a dynamic token; encrypt the identifier token with the dynamic token; sign the encrypted identifier token with the private key; generate an authentication payload that includes the signed and encrypted identifier token; transmit, via an authentication application programming interface, the generated authentication payload to an authentication service that is associated with the application; and receive an authentication response from the authentication service.

In accordance with an exemplary embodiment, to permit access to the application, the processor may be further configured to bypass at least one authentication requirement of the application, wherein secured access to the application is permitted without additional authentication by the application.

In accordance with an exemplary embodiment, the request may correspond to an interaction between the user and the application on the user device, the interaction may include an action to open the application, access the application, and login to the application.

In accordance with an exemplary embodiment, the successful device authentications may relate to successful authentication of the user by the user device using at least one from among a code, a personal identification number, and biometric information, the biometric information may include at least one from among fingerprint information, facial feature information, and iris pattern information.

In accordance with an exemplary embodiment, to determine whether the device authentication data is within the predetermined threshold, the processor may be further configured to parse the device authentication data to identify at least one successful device authentication event and the timeline; determine, by using the timeline, whether the at least one successful device authentication event is proximate to the request; and compare a time associated with the at least one successful device authentication event with the predetermined threshold when the at least one successful device authentication event is proximate to the request.

In accordance with an exemplary embodiment, the predetermined threshold may correspond to a time period that is predetermined by the user as a user preference for the application.

In accordance with an exemplary embodiment, the predetermined threshold may correspond to a time period that is dynamically determined for the user based on a corresponding user profile, a corresponding user activity record, and an operating guideline.

In accordance with an exemplary embodiment, prior to authenticating the request, the processor may be further configured to initiate a complimentary authentication event to retrieve complimentary identifying information from the user via the user device, the complimentary identifying information may relate to a secondary authentication factor; and authenticate the request by using the device authentication data and the complimentary identifying information.

According to an aspect of the present disclosure, a non-transitory computer readable storage medium storing instructions for facilitating application authentication bypass based on proximate with time using device authentication is disclosed. The storage medium including executable code which, when executed by a processor, may cause the processor to receive a request from a user to access an application on a user device, the request may include an application authentication request; access the user device via a device application programming interface; retrieve, via the device application programming interface, device authentication data, the device authentication data may include a timeline of successful device authentications; determine whether the device authentication data is within a predetermined threshold; authenticate the request by using the device authentication data when the device authentication data is within the predetermined threshold; and permit access to the application based on a result of the authenticating.

In accordance with an exemplary embodiment, when executed by the processor to authenticate the request, the executable code may further cause the processor to retrieve a private key, a device token, and an identifier token from a device keychain of the user device, the device token may include a static token and a dynamic token; encrypt the identifier token with the dynamic token; sign the encrypted identifier token with the private key; generate an authentication payload that includes the signed and encrypted identifier token; transmit, via an authentication application programming interface, the generated authentication payload to an authentication service that is associated with the application; and receive an authentication response from the authentication service.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
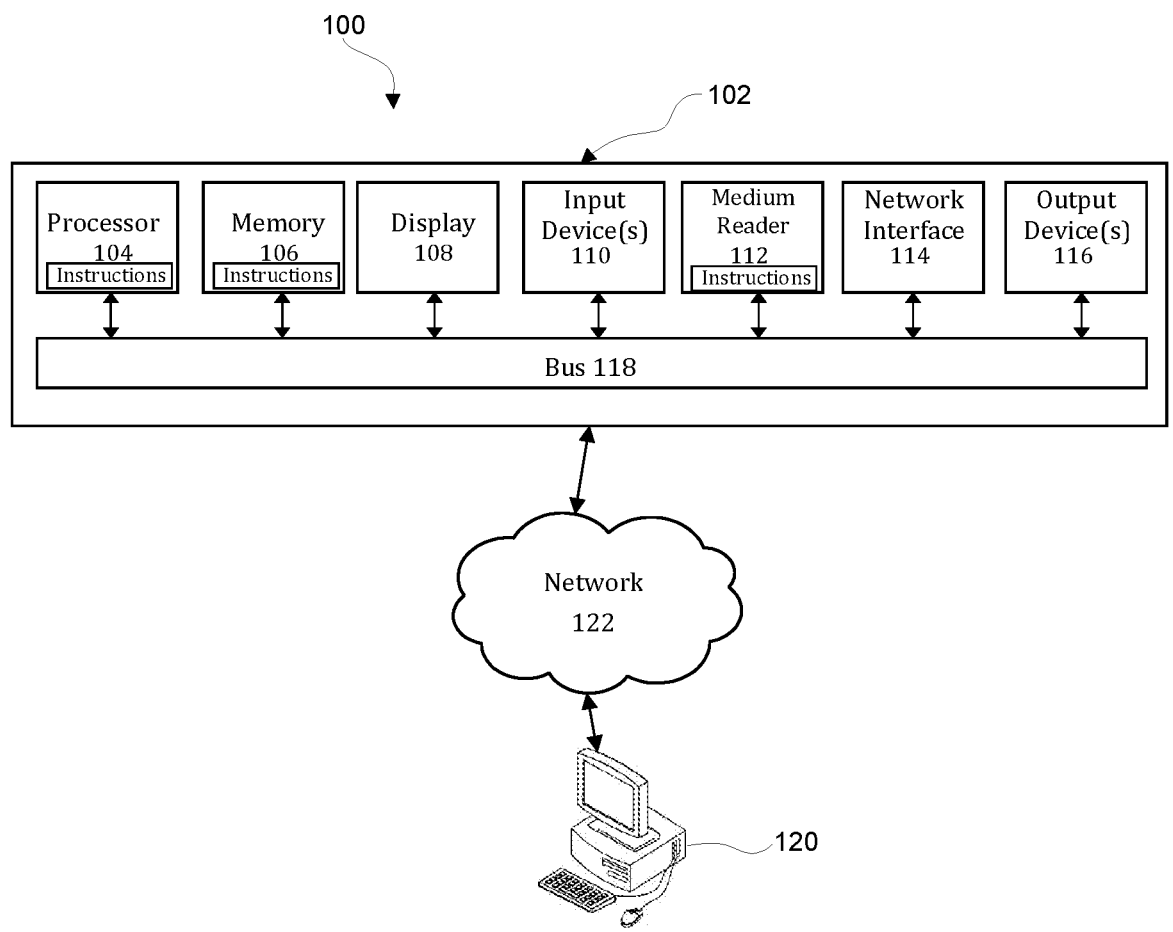
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating application authentication bypass based on proximate with time using device authentication to provide frictionless application authentication.

Figure 2:
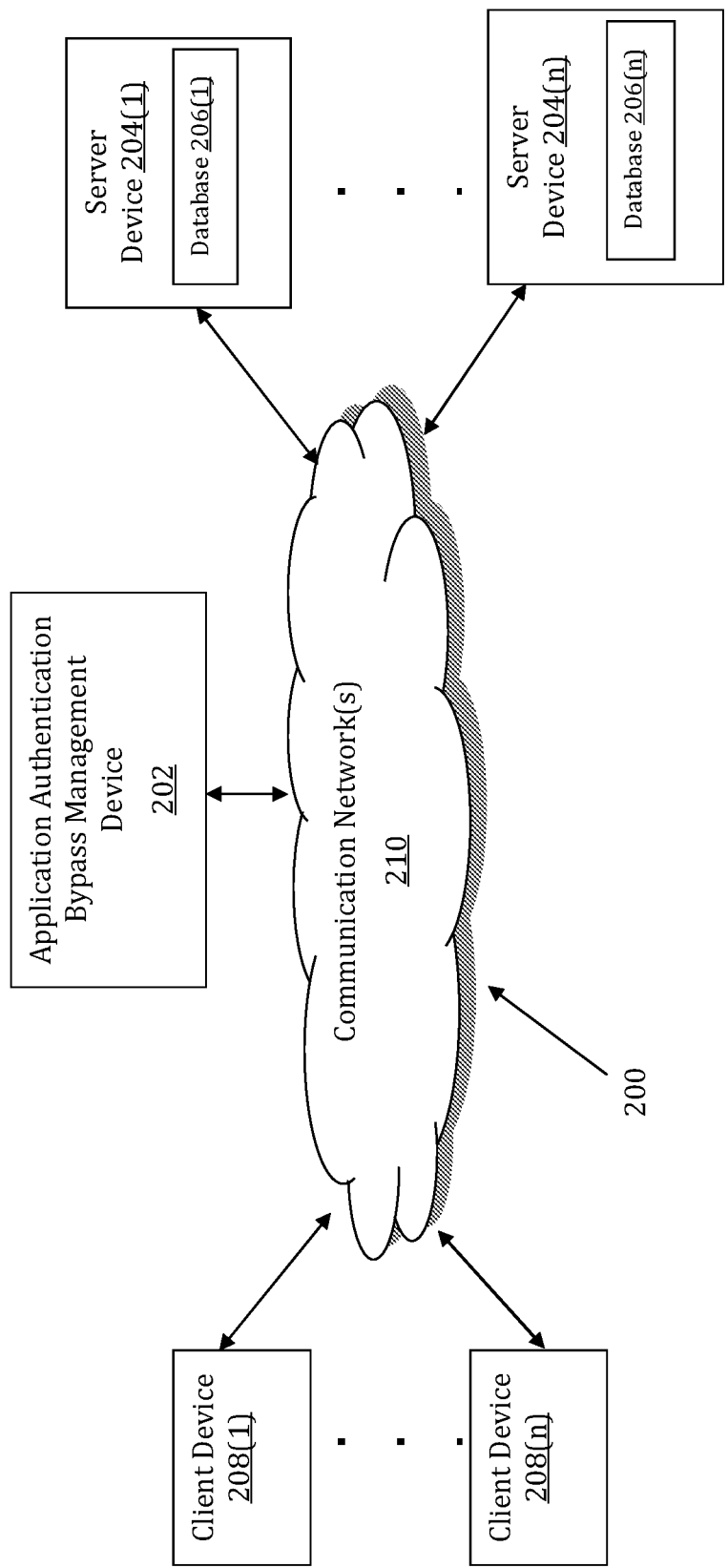
FIG. 2 illustrates an exemplary diagram of a network environment.

Referring to FIG. 2, a schematic of an exemplary network environment 200 for implementing a method for facilitating application authentication bypass based on proximate with time using device authentication to provide frictionless application authentication is illustrated. In an exemplary embodiment, the method is executable on any networked computer platform, such as, for example, a personal computer (PC).

The method for facilitating application authentication bypass based on proximate with time using device authentication to provide frictionless application authentication may be implemented by an Application Authentication Bypass Management (AABM) device 202. The AABM device 202 may be the same or similar to the computer system 102 as described with respect to FIG. 1. The AABM device 202 may store one or more applications that can include executable instructions that, when executed by the AABM device 202, cause the AABM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AABM device 202 itself, may be located in virtual server(s) running in a cloud-based computing environment rather than being tied to one or more specific physical network computing devices. Also, the application(s) may be running in one or more virtual machines (VMs) executing on the AABM device 202. Additionally, in one or more embodiments of this technology, virtual machine(s) running on the AABM device 202 may be managed or supervised by a hypervisor.

In the network environment 200 of FIG. 2, the AABM device 202 is coupled to a plurality of server devices 204(1)-204(n) that hosts a plurality of databases 206(1)-

206(n), and also to a plurality of client devices 208(1)-208(n) via communication network(s) 210. A communication interface of the AABM device 202, such as the network interface 114 of the computer system 102 of FIG. 1, operatively couples and communicates between the AABM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AABM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AABM devices that efficiently implement a method for facilitating application authentication bypass based on proximate with time using device authentication to provide frictionless application authentication.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AABM device 202 may be a standalone device or integrated with one or more other devices or apparatuses, such as one or more of the server devices 204(1)-204(n), for example. In one particular example, the AABM device 202 may include or be hosted by one of the server devices 204(1)-204(n), and other arrangements are also possible. Moreover, one or more of the devices of the AABM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AABM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to user requests, application authentication requests, device authentication data, timeline data, device tokens, authentication blocks, device private keys, cryptographic variables, authentication payloads, static tokens, and authentication responses.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AABM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AABM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AABM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AABM device 202, the server devices 204(1)-204(n), or the client devices 208(1)-208(n), for example, may be configured to operate as virtual instances on the same physical machine. In other words, one or more of the AABM device 202, the server devices 204(1)-204(n), or the client devices 208(1)-208(n) may operate on the same physical device rather than as separate devices communicating through communication network(s) 210. Additionally, there may be more or fewer AABM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
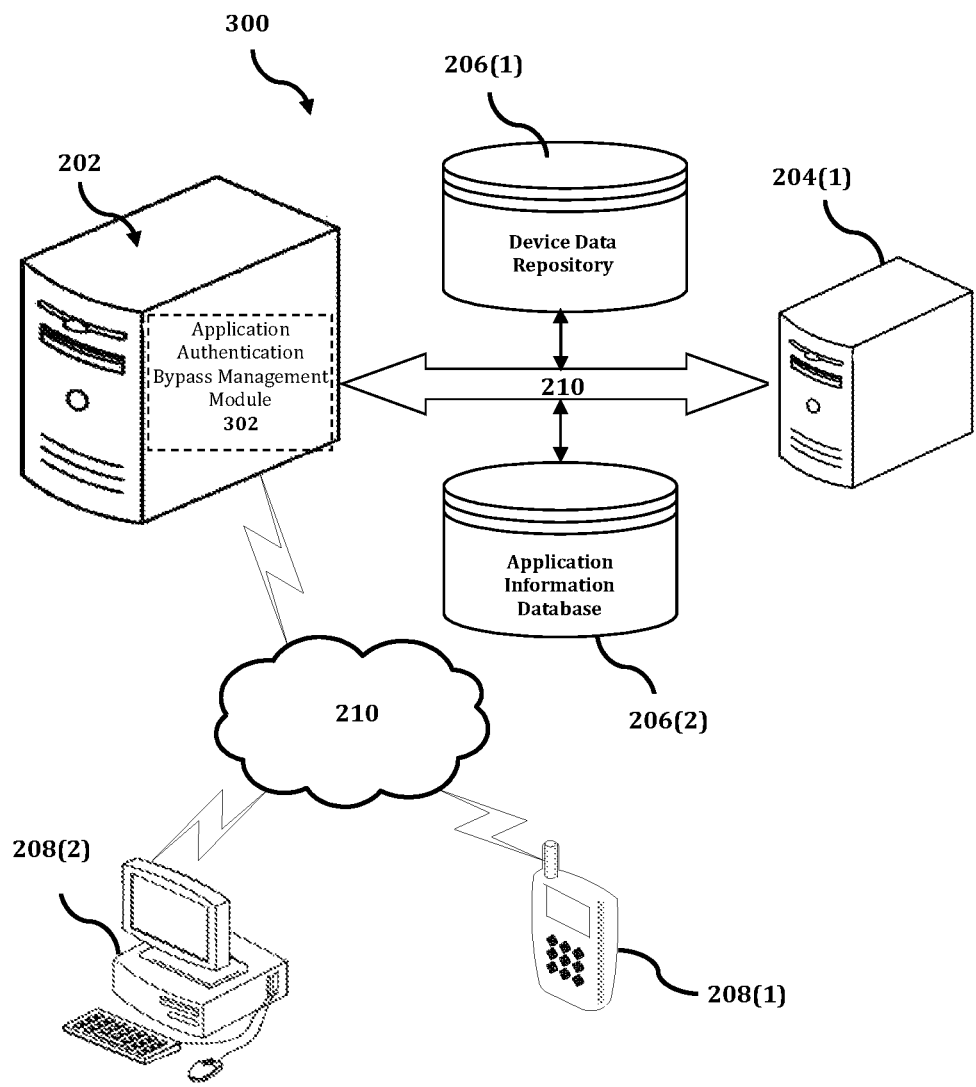
FIG. 3 shows an exemplary system for implementing a method for facilitating application authentication bypass based on proximate with time using device authentication to provide frictionless application authentication.

The AABM device 202 is described and shown in FIG. 3 as including an application authentication bypass management module 302, although it may include other rules, policies, modules, databases, or applications, for example. As will be described below, the application authentication bypass management module 302 is configured to implement a method for facilitating application authentication bypass based on proximate with time using device authentication to provide frictionless application authentication.

An exemplary process 300 for implementing a mechanism for facilitating application authentication bypass based on proximate with time using device authentication to provide frictionless application authentication by utilizing the network environment of FIG. 2 is shown as being executed in FIG. 3. Specifically, a first client device 208(1) and a second client device 208(2) are illustrated as being in communication with AABM device 202. In this regard, the first client device 208(1) and the second client device 208(2) may be "clients" of the AABM device 202 and are described herein as such. Nevertheless, it is to be known and understood that the first client device 208(1) and/or the second client device 208(2) need not necessarily be "clients" of the AABM device 202, or any entity described in association therewith herein. Any additional or alternative relationship may exist between either or both of the first client device 208(1) and the second client device 208(2) and the AABM device 202, or no relationship may exist.

Further, AABM device 202 is illustrated as being able to access a device data repository 206(1) and an application information database 206(2). The application authentication bypass management module 302 may be configured to access these databases for implementing a method for facilitating application authentication bypass based on proximate with time using device authentication to provide frictionless application authentication.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AABM device 202 via broadband or cellular communication. Of course, these embodiments are merely exemplary and are not limiting or exhaustive.

Upon being started, the application authentication bypass management module 302 executes a process for facilitating application authentication bypass based on proximate with time using device authentication to provide frictionless application authentication. An exemplary process for facilitating application authentication bypass based on proximate with time using device authentication to provide frictionless application authentication is generally indicated at flowchart 400 in FIG. 4.

Figure 4:
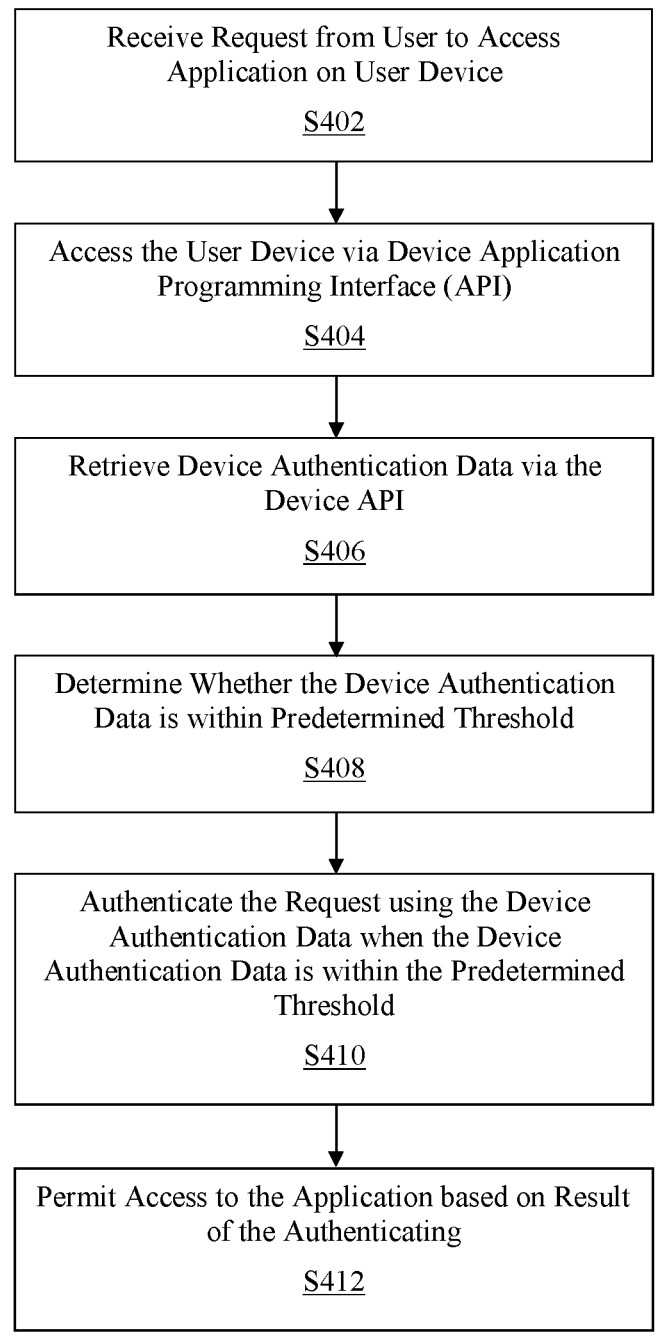
FIG. 4 is a flowchart of an exemplary process for implementing a method for facilitating application authentication bypass based on proximate with time using device authentication to provide frictionless application authentication.

In the process 400 of FIG. 4, at step S402, a request from a user to access an application on a user device may be received. The request may include an application authentication request. In an exemplary embodiment, the request may correspond to an interaction between the user and the application on the user device. The interaction may include an action to open the application, access the application, and login to the application. For example, the user may interact with a display on the user device to select an icon associated with the application from a menu interface.

In another exemplary embodiment, the action to open the application, access the application, and login to the application may correspond to at least one from among a physical interaction and a nonphysical interaction. For example, the physical interaction may include physical contact with a display of the user device to select the application as well as a gesture that may be translated into a command by the user device. Similarly, the nonphysical interaction for example, may include a verbal command that instructs the user device to open the application, access the application, and login to the application.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the user device may be accessed via a device application programming interface (API). The device API may relate to an interface for interacting with software that manages the functionalities of the user device such as, for example, an operating system of the user device. In an exemplary embodiment, the API may correspond to a software intermediary that allows at least two software applications to communicate with each other. The API may facilitate interactions between multiple software applications by defining parameters such as, for example, the kind of calls and/or requests that can be made, how the calls and/or requests are made, the data formats that should be used, and the conventions that must be followed.

At step S406, device authentication data may be retrieved via the device API. The device authentication data may include a timeline of successful device authentications. In an exemplary embodiment, the device authentication data may correspond to a record of the successful device authentications. The device authentication data may include information related to each of the successful device authentications. For example, the device authentication data may include a description of an authentication technique and a timestamp for each of the successful device authentications. The description of the authentication technique may indicate that the user was authenticated via fingerprint biometrics to unlock the user device.

In another exemplary embodiment, the successful device authentications may relate to successful authentication of the user by the user device using at least one from among a code, a personal identification number (PIN), and biometric information. The biometric information may include at least one from among fingerprint information, facial feature information, and iris pattern information. As will be appreciated by a person of ordinary skill in the art, the user device may employ any authentication technique to identify and authenticate the user.

At step S408, whether the device authentication data is within a predetermined threshold may be determined. In an exemplary embodiment, to determine whether the device authentication data is within the predetermined threshold, the device authentication data may be parsed to identify successful device authentication events and a corresponding timeline.

Then, a determination may be made as to whether the successful device authentication events are proximate to the request. A proximity to the request may be based on a time interval between the successful device authentication events and the request. The determination may filter the successful device authentication events to improve performance for subsequent actions consistent with present disclosures. Finally, a time associated with each of the successful device authentication events may be compared with the predetermined threshold when the successful device authentication events are proximate to the request.

In another exemplary embodiment, the predetermined threshold may correspond to a time period such as, for example, a thirty-seconds time period that is predetermined by the user as a user preference for the application. The predetermined threshold may be predetermined by the user for each of a plurality of applications on the user device. In another exemplary embodiment, the predetermined threshold may correspond to a time period that is dynamically determined for the user based on a corresponding user profile, a corresponding user activity record, and an operating guideline. For example, the predetermined threshold may be automatically adjusted throughout the day based on analysis of user activity records, user preferences, and security guidelines associated with the application.

At step S410, the request may be authenticated by using the device authentication data when the device authentication data is within the predetermined threshold. The request may be authenticated by using the device authentication data without additional identifying information from the user and/or additional authentication steps from the application. For example, when the authentication data indicates that the user has been authenticated by the device within the predetermined threshold, the user may be granted access to the application by using the authentication data without additional application authentication.

In an exemplary embodiment, to authenticate the request, a private key, a device token, and an identifier token may be retrieved from a device keychain of the user device. The device token may include a static component such as, for example, a static token and a dynamic component such as, for example, a dynamic token. The identifier token may be automatically issued to the user device after an opt-in process consistent with present disclosures. The private key may relate to a cryptographic variable that is retrieved from a secure enclave of the user device. The secure enclave of the user device may relate to sets of security-related instruction codes that are built directly into the central processing units of the user device. Then, the identifier token may be encrypted with the dynamic token and signed with the private key. That is, the encrypted identifier token may be signed with the private key.

Further, an authentication payload that includes the signed and encrypted identifier token may be generated. The authentication payload may include information such as, for example, metadata that relates to the signed and encrypted identifier token. The generated authentication payload may be transmitted to an authentication service that is associated with the application. The generated authentication payload may be transmitted via an authentication application programming interface. The authentication service may be unique to the application and serves to authenticate the user for the application. Finally, an authentication response to grant access to the application may be received from the authentication service. Consistent with present disclosures, the authentication of the request using the authentication data may be accomplished automatically without additional input from the user.

In another exemplary embodiment, complementary identifying information may be requested from the user prior to authenticating the request to facilitate multi-factor authentication. A complimentary authentication event may be initiated to retrieve the complimentary identifying information from the user. The complimentary identifying information may be retrieved from the user via the user device. The complimentary identifying information may relate to a secondary authentication factor that is usable in multi-factor authentication. Then, the request may be authenticated by using both the device authentication data and the complimentary identifying information. By using the device authentication data as an authentication factor, multi-factor authentication may be implemented with fewer redundant user inputs.

At step S412, access to the application may be permitted based on a result of the authenticating. In an exemplary embodiment, to permit access to the application, authentication requirements of the application may be bypassed. That is, secured access to the application may be permitted without additional authentication by the application. In another exemplary embodiment, the specific authentication requirements that may be bypassed may be dictated by operation guidelines such as, for example, a security guideline of the application. As will be appreciated by a person of ordinary skill in the art, bypassing the authentication requirements of the application may improve user experience by reducing redundant authentications that require multiple user inputs.

In another exemplary embodiment, an opt-in process may be initiated by the user consistent with present disclosures to facilitate the application authentication bypass. The opt-in process may serve to bind the user device as well as to provide a unique identifier token for each of the users of the user device. Upon completion of the opt-in process, the identifier token may be provided by an authentication service and stored within the device keychain of the user device. In another exemplary embodiment, the opt-in process may be initiated by the user after successful authentication of user credentials. The opt-in process may be completed by the user after an initial interaction with the application as well as at any point thereafter based on user preference.

Figure 5:
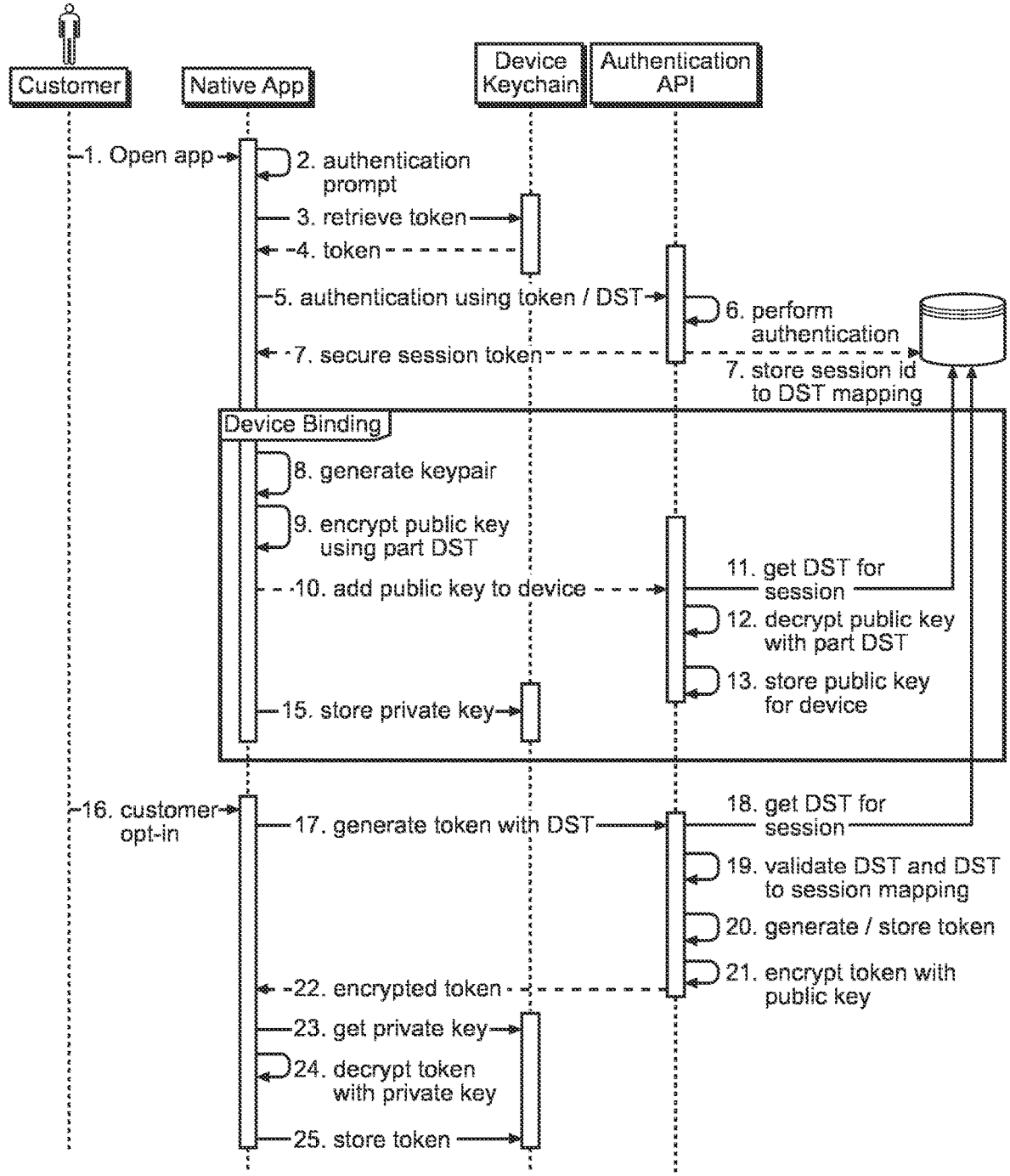
FIG. 5 is a flow diagram of an exemplary opt-in process for implementing a method for facilitating application authentication bypass based on proximate with time using device authentication to provide frictionless application authentication.

FIG. 5 is a flow diagram 500 of an exemplary opt-in process for implementing a method for facilitating application authentication bypass based on proximate with time using device authentication to provide frictionless application authentication. In FIG. 5, the opt-in process may be initiated by a user to facilitate the application authentication bypass. The opt-in process may facilitate storage of a token such as, for example, an identifier token on the device keychain of a user device by the application. The identifier token may correspond to the user.

At step 1, the user may interact with an application by opening the application on a user device. At step 2, an authentication prompt may be provided to the user for user credentials. At step 3, the application may request a token from a device keychain of the user device. At step 4, the token may be retrieved by the application. At step 5, the application initiates authentication via an authentication application programming interface (API) by using the token and a device token (DST). At step 6, the authentication API performs the authentication. At step 7, the application receives a secure session token from the authentication API, which also stores a session identifier to DST mapping.

A user device binding process may be initiated at step 8 when the application generates a key pair that includes a private key and a public key. At step 9, the application encrypts the public key by using a dynamic part of the DST. At step 10, the application initiates a process via the authentication API to add the encrypted public key to the user device. At step 11, the authentication API gets a session DST for the current session from the DST mapping. At step 12, the authentication API decrypts the encrypted public key with the dynamic part of the session DST. At step 13, the authentication API stores the decrypted public key for the user device. At step 15, the application stores the private key in the device keychain of the user device.

Then, at step 16, the user initiates an opt-in process with the application. At step 17, the application generates a token with the DST for the authentication API. At step 18, the authentication API gets a session DST for the current session. At step 19, the authentication API validates the DST and the session DST to session mapping. At step 20, the authentication API generates and stores a token. At step 21, the authentication API encrypts the generated token with the public key. At step 22, the encrypted token is transmitted to the application. At step 23, the application gets the private key from the device keychain. At step 24, the application decrypts the encrypted token with the private key. At step 25, the decrypted token is stored in the device keychain.

Figure 6:
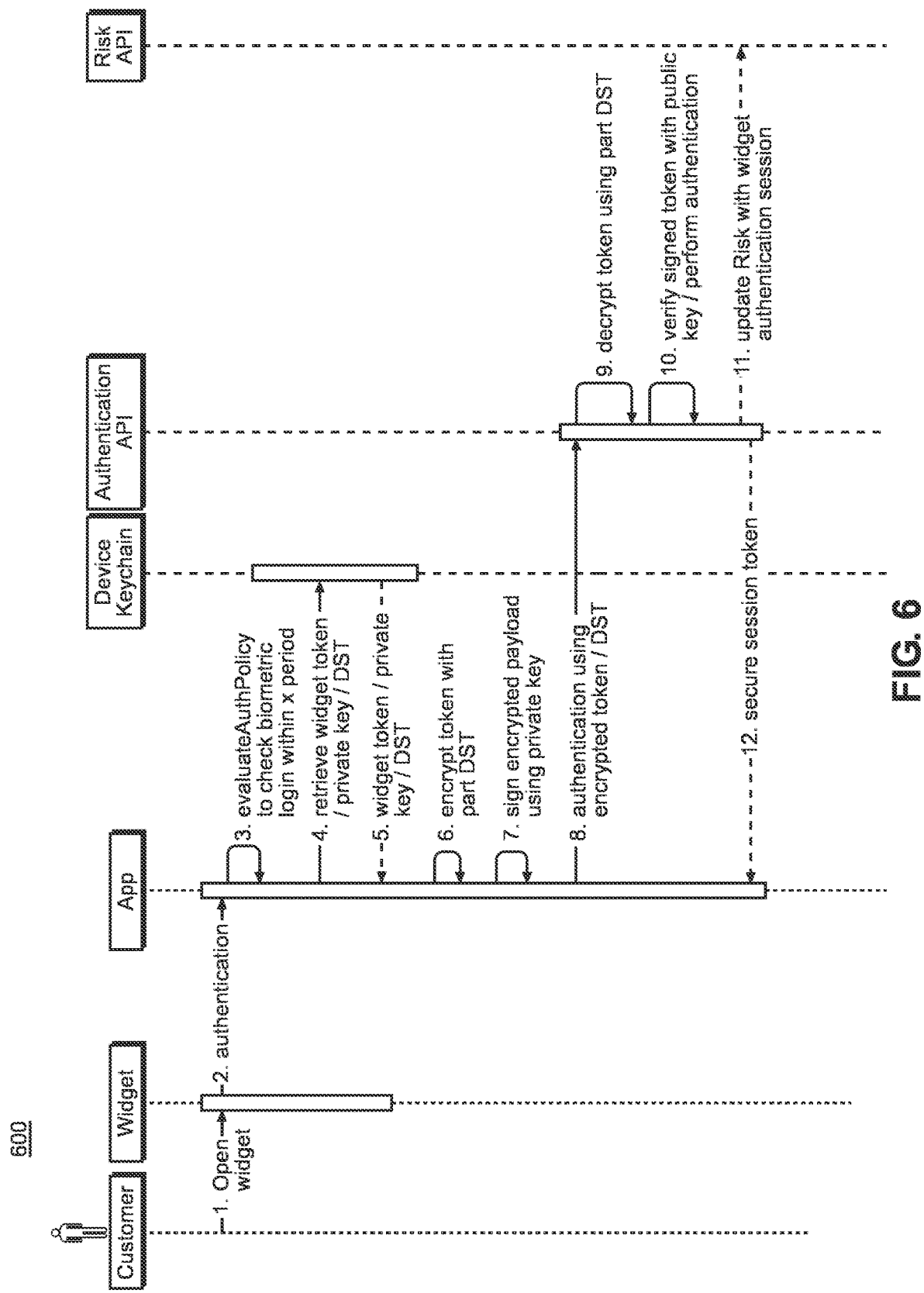
FIG. 6 is a flow diagram of an exemplary authentication process for implementing a method for facilitating application authentication bypass based on proximate with time using device authentication to provide frictionless application authentication.

FIG. 6 is a flow diagram 600 of an exemplary authentication process for implementing a method for facilitating application authentication bypass based on proximate with time using device authentication to provide frictionless application authentication. In FIG. 6, the authentication process may be initiated by an application when a user interacts with the application. Consistent with present disclosures the authentication process may facilitate application authentication bypass.

At step 1, the user interacts with the application by opening a widget that is associated with the application. At step 2, the widget initiates the authentication action with the application. At step 3, the application evaluates an authentication policy consistent with present disclosures to check whether biometric login was successful within a predetermined time period. At step 4, based on a result of the evaluation, the application retrieves a token, a private key, and a device token (DST) from a device keychain of a user device. At step 5, the token, the private key, and the DST is provided to the application by the device keychain. At step 6, the application encrypts the token with a dynamic part of the DST. At step 7, the application signs the encrypted payload by using the private key.

Then, at step 8, the application initiates an authentication process with an authentication application programming interface (API) by using the encrypted payload. At step 9, the authentication API decrypts the token by using the dynamic part of the DST. At step 10, the authentication API verifies the signed token with the public key and performs authentication of the user. At step 11, the authentication API updates a risk API with information that relates to the current authentication session. At step 12, the authentication API transmits a secure session token to the application.

Accordingly, with this technology, an optimized process for facilitating application authentication bypass based on proximate with time using device authentication to provide frictionless application authentication is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating application authentication bypass based on a timeline of successful device authentications, the method being implemented by at least one processor, the method comprising:
   receiving, by the at least one processor, a request from a user to access an application on a user device, the request including an application authentication request, wherein the application has at least one application authentication requirement;
   accessing, by the at least one processor, the user device via a device application programming interface;
   retrieving, by the at least one processor via the device application programming interface, device authentication data, the device authentication data including the timeline of successful device authentications;
   determining, by the at least one processor based on the timeline of successful device authentications, whether the device authentication data is within a predetermined threshold time period;
   when the device authentication data is within the predetermined threshold time period, bypassing the at least one application authentication requirement and authenticating, by the at least one processor, the request by using the device authentication data; and
   permitting, by the at least one processor, access to the application based on a result of the authenticating.

2. The method of claim 1, wherein authenticating the request further comprises:
   retrieving, by the at least one processor, a private key, a device token, and an identifier token from a device keychain of the user device, the device token including a static token and a dynamic token;

encrypting, by the at least one processor, the identifier token with the dynamic token;

signing, by the at least one processor, the encrypted identifier token with the private key;

generating, by the at least one processor, an authentication payload that includes the signed and encrypted identifier token;

transmitting, by the at least one processor via an authentication application programming interface, the generated authentication payload to an authentication service that is associated with the application; and receiving, by the at least one processor, an authentication response from the authentication service.

3. The method of claim 1,
wherein secured access to the application is permitted without additional authentication by the application.

4. The method of claim 1, wherein the request corresponds to an interaction between the user and the application on the user device, the interaction including an action to open the application, access the application, and login to the application.

5. The method of claim 1, wherein the successful device authentications relate to successful authentication of the user by the user device using at least one from among a code, a personal identification number, and biometric information, the biometric information including at least one from among fingerprint information, facial feature information, and iris pattern information.

6. The method of claim 1, wherein determining whether the device authentication data is within the predetermined threshold time period further comprises:

parsing, by the at least one processor, the device authentication data to identify at least one successful device authentication event and the timeline;

determining, by the at least one processor using the timeline, whether the at least one successful device authentication event is proximate to the request; and comparing, by the at least one processor, a time associated with the at least one successful device authentication event with the predetermined threshold time period when the at least one successful device authentication event is proximate to the request.

7. The method of claim 6, wherein the predetermined threshold time period is predetermined by the user as a user preference for the application.

8. The method of claim 6, wherein the predetermined threshold time period corresponds to a time period that is dynamically determined for the user based on a corresponding user profile, a corresponding user activity record, and an operating guideline.

9. The method of claim 1, wherein, prior to authenticating the request, the method further comprises:

initiating, by the at least one processor, a complimentary authentication event to retrieve complimentary identifying information from the user via the user device, the complimentary identifying information relating to a secondary authentication factor; and authenticating, by the at least one processor, the request by using the device authentication data and the complimentary identifying information.

10. A computing device configured to implement an execution of a method for facilitating application authentication bypass based on a timeline of successful device authentications, the computing device comprising:

a processor;
a memory; and
a data transmission interface coupled to each of the processor and the memory, wherein the processor is configured to:

receive a request from a user to access an application on a user device, the request including an application authentication request, wherein the application has at least one application authentication requirement;

access the user device via a device application programming interface;

retrieve, via the device application programming interface, device authentication data, the device authentication data including the timeline of successful device authentications;

determine, based on the timeline of successful device authentications, whether the device authentication data is within a predetermined threshold time period;

when the device authentication data is within the predetermined threshold time period, bypass the at least one application authentication requirement and authenticate the request by using the device authentication data; and permit access to the application based on a result of the authenticating.

11. The computing device of claim 10, wherein, to authenticate the request, the processor is further configured to:

retrieve a private key, a device token, and an identifier token from a device keychain of the user device, the device token including a static token and a dynamic token;

encrypt the identifier token with the dynamic token;
sign the encrypted identifier token with the private key;
generate an authentication payload that includes the signed and encrypted identifier token;
transmit, via an authentication application programming interface, the generated authentication payload to an authentication service that is associated with the application; and
receive an authentication response from the authentication service.

12. The computing device of claim 10,
wherein secured access to the application is permitted without additional authentication by the application.

13. The computing device of claim 10, wherein the request corresponds to an interaction between the user and the application on the user device, the interaction including an action to open the application, access the application, and login to the application.

14. The computing device of claim 10, wherein the successful device authentications relate to successful authentication of the user by the user device using at least one from among a code, a personal identification number, and biometric information, the biometric information including at least one from among fingerprint information, facial feature information, and iris pattern information.

15. The computing device of claim 10, wherein, to determine whether the device authentication data is within the predetermined threshold time period, the processor is further configured to:

parse the device authentication data to identify at least one successful device authentication event and the timeline;

determine, by using the timeline, whether the at least one successful device authentication event is proximate to the request; and compare a time associated with the at least one successful device authentication event with the predetermined threshold time period when the at least one successful device authentication event is proximate to the request.

16. The computing device of claim 15, wherein the predetermined threshold time period is predetermined by the user as a user preference for the application.

17. The computing device of claim 15, wherein the predetermined threshold time period corresponds to a time period that is dynamically determined for the user based on a corresponding user profile, a corresponding user activity record, and an operating guideline.

18. The computing device of claim 10, wherein, prior to authenticating the request, the processor is further configured to:
   initiate a complimentary authentication event to retrieve complimentary identifying information from the user via the user device, the complimentary identifying information relating to a secondary authentication factor; and
   authenticate the request by using the device authentication data and the complimentary identifying information.

19. A non-transitory computer readable storage medium storing instructions for facilitating application authentication bypass based on a timeline of successful device authentications, the storage medium comprising executable code which, when executed by a processor, causes the processor to:
   receive a request from a user to access an application on a user device, the request including an application authentication request, wherein the application has at least one application authentication requirement;
   access the user device via a device application programming interface;
   retrieve, via the device application programming interface, device authentication data, the device authentication data including the timeline of successful device authentications;
   determine, based on the timeline of successful device authentications, whether the device authentication data is within a predetermined threshold time period;
   when the device authentication data is within the predetermined threshold time period, bypass the at least one application authentication requirement and authenticate the request by using the device authentication data; and
   permit access to the application based on a result of the authenticating.

20. The storage medium of claim 19, wherein, when executed by the processor to authenticate the request, the executable code further causes the processor to:
   retrieve a private key, a device token, and an identifier token from a device keychain of the user device, the device token including a static token and a dynamic token;
   encrypt the identifier token with the dynamic token;
   sign the encrypted identifier token with the private key;
   generate an authentication payload that includes the signed and encrypted identifier token;
   transmit, via an authentication application programming interface, the generated authentication payload to an authentication service that is associated with the application; and
   receive, an authentication response from the authentication service.

* * * * *